(12) United States Patent
Nagase (10) Patent No.: US 8,368,558 B2
(45) Date of Patent: Feb. 5, 2013

(54) PARKING GUIDE SYSTEM, PARKING GUIDE METHOD AND PROGRAM

(75) Inventor: Kenji Nagase, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 344 days.

(21) Appl. No.: 12/453,205

(22) Filed: May 1, 2009

(65) Prior Publication Data
US 2009/0309761 A1 Dec. 17, 2009

(30) Foreign Application Priority Data

Jun. 11, 2008 (JP) ................................. 2008-153231

(51) Int. Cl.
*B60Q 1/48* (2006.01)
*G01C 9/00* (2006.01)
*H04W 24/00* (2009.01)

(52) U.S. Cl. .................. 340/932.2; 702/150; 455/456.5

(58) Field of Classification Search ............... 340/932.2; 702/150; 701/201
See application file for complete search history.

(56) References Cited

U.S. PATENT DOCUMENTS

| | | | | |
|---|---|---|---|---|
| 7,058,506 B2 * | 6/2006 | Kawase et al. ................ | 701/201 |
| 7,418,342 B1 * | 8/2008 | Bell et al. ...................... | 701/213 |
| 7,536,258 B2 * | 5/2009 | Kudo et al. .................... | 701/209 |
| 7,720,596 B2 * | 5/2010 | Kobuya et al. ................ | 701/200 |
| 2002/0143490 A1 * | 10/2002 | Maeda et al. .................. | 702/150 |
| 2005/0033511 A1 * | 2/2005 | Pechatnikov et al. ......... | 701/210 |
| 2005/0096974 A1 * | 5/2005 | Chagoly et al. ................ | 705/13 |
| 2008/0033640 A1 * | 2/2008 | Amano ......................... | 701/209 |

FOREIGN PATENT DOCUMENTS

| | | |
|---|---|---|
| EP | 1 003 018 A2 | 5/2000 |
| JP | A-10-239076 | 9/1998 |
| JP | A-2003-222527 | 8/2003 |
| JP | A-2005-228002 | 8/2005 |
| JP | A-2005-326202 | 11/2005 |
| JP | A-2007-285734 | 11/2007 |
| JP | A-2009-211253 | 9/2009 |

OTHER PUBLICATIONS

Apr. 13, 2011 European Search Report issued in EP 09 00 6128.
Japanese Patent Office, Notification of Reason(s) for Refusal mailed Apr. 17, 2012 in Japanese Patent Application No. 2008-153231 w/Partial English-language Translation.

\* cited by examiner

*Primary Examiner* — George Bugg
*Assistant Examiner* — Jack K Wang
(74) *Attorney, Agent, or Firm* — Oliff & Berridge, PLC (57) ABSTRACT

Every time a vehicle is parked in a parking lot, a CPU updates priorities of information stored in a parking lot learning table which is stored in a parking lot DB based on parking lot information related to the parking lot and information of an entrance wait time for each parking lot, a traffic jam in the vicinity of a destination facility, and so on, which are distributed regularly from a road traffic information center or the like.

9 Claims, 5 Drawing Sheets

| | | | Priority Information | REMARKS |
|---|---|---|---|---|
| 61 | AFFILIATED PARKING LOT | | ▬ | PRIORITY INCREASES WHEN PARKED IN AFFILIATED PARKING LOT |
| 62 | CONGESTION STATUS | ENTRANCE WAIT TIME | ▬▬▬▬ | PRIORITY INCREASES WHEN AVOIDED PARKING LOT HAVING ENTRANCE WAIT TIME |
| | | SURROUNDING TRAFFIC JAM | ▬ | PRIORITY INCREASES WHEN AVOIDED TRAFFIC JAM IN VICINITY OF DESTINATION |
| 63 | PARKING LOT STRUCTURE | MAXIMUM VEHICLE HEIGHT | 220cm | SMALLEST VALUE OF MAXIMUM VEHICLE HEIGHT IS STORED INSTEAD OF PRIORITY |
| | | MINIMUM GROUND CLEARANCE | 25cm | LARGEST VALUE OF MINIMUM GROUND CLEARANCE IS STORED INSTEAD OF PRIORITY |
| | | TOWER TYPE | ▬▬ | PRIORITY INCREASES WHEN PARKED IN TOWER TYPE PARKING LOT |
| | | PLATE | ▬ | PRIORITY INCREASES WHEN PARKED IN PLATE TYPE PARKING LOT |
| | | GATE | ▬▬ | PRIORITY INCREASES WHEN PARKED IN GATE TYPE PARKING LOT |
| | | MULTILEVEL PARKING LOT | ▬ | PRIORITY INCREASES WHEN PARKED IN MULTILEVEL PARKING LOT |
| 64 | PARKING LOT SCALE | ALLOWABLE NUMBER OF VEHICLES — LESS THAN 10 | ▬▬ | PRIORITY INCREASES WHEN PARKED IN PARKING LOT ALLOWING LESS THAN 10 VEHICLES |
| | | LESS THAN 30 | ▬▬▬ | PRIORITY INCREASES WHEN PARKED IN PARKING LOT ALLOWING LESS THAN 30 VEHICLES |
| | | LESS THAN 100 | ▬▬ | PRIORITY INCREASES WHEN PARKED IN PARKING LOT ALLOWING LESS THAN 100 VEHICLES |
| | | 100 OR MORE | ▬▬▬ | PRIORITY INCREASES WHEN PARKED IN PARKING LOT ALLOWING MORE THAN 100 VEHICLES |
| 65 | PARKING FEE | DIFFERENCE IN FEE FROM SURROUNDING PARKING LOTS | ▬▬▬▬ | PRIORITY INCREASES WHEN PARKED IN PARKING LOT CHEAPER THAN SURROUNDING PARKING LOTS |
| | | PRESENCE OF FEE UPPER LIMIT | ▬▬ | PRIORITY INCREASES WHEN PARKED IN PARKING LOT WITH FIXED FEE OR WITH FEE UPPER LIMIT |
| 66 | DISTANCE TO DESTINATION | | ▬▬▬▬▬ | PRIORITY INCREASES WHEN PARKED WHERE DISTANCE TO DESTINATION IS CLOSEST |
| 67 | OPENING HOUR | OPEN 24 HOURS | ▬ | PRIORITY INCREASES WHEN PARKED IN PARKING LOT THAT IS OPEN 24 HOURS |

51 — PRIORITY INFORMATION

| | | | Value | Priority Information | Remarks |
|---|---|---|---|---|---|
| 61 | AFFILIATED PARKING LOT | | | | PRIORITY INCREASES WHEN PARKED IN AFFILIATED PARKING LOT |
| 62 | CONGESTION STATUS | ENTRANCE WAIT TIME | | ▓▓▓ | PRIORITY INCREASES WHEN AVOIDED PARKING LOT HAVING ENTRANCE WAIT TIME |
| | | SURROUNDING TRAFFIC JAM | | | PRIORITY INCREASES WHEN AVOIDED TRAFFIC JAM IN VICINITY OF DESTINATION |
| 63 | PARKING LOT STRUCTURE | MAXIMUM VEHICLE HEIGHT | 220cm | | SMALLEST VALUE OF MAXIMUM VEHICLE HEIGHT IS STORED INSTEAD OF PRIORITY |
| | | MINIMUM GROUND CLEARANCE | 25cm | | LARGEST VALUE OF MINIMUM GROUND CLEARANCE IS STORED INSTEAD OF PRIORITY |
| | | TOWER TYPE | | ▓ | PRIORITY INCREASES WHEN PARKED IN TOWER TYPE PARKING LOT |
| | | PLATE | | | PRIORITY INCREASES WHEN PARKED IN PLATE TYPE PARKING LOT |
| | | GATE | | ▓ | PRIORITY INCREASES WHEN PARKED IN GATE TYPE PARKING LOT |
| | | MULTILEVEL PARKING LOT | | | PRIORITY INCREASES WHEN PARKED IN MULTILEVEL PARKING LOT |
| 64 | PARKING LOT SCALE | ALLOWABLE NUMBER OF VEHICLES | LESS THAN 10 | | PRIORITY INCREASES WHEN PARKED IN PARKING LOT ALLOWING LESS THAN 10 VEHICLES |
| | | | LESS THAN 30 | ▓ | PRIORITY INCREASES WHEN PARKED IN PARKING LOT ALLOWING LESS THAN 30 VEHICLES |
| | | | LESS THAN 100 | | PRIORITY INCREASES WHEN PARKED IN PARKING LOT ALLOWING LESS THAN 100 VEHICLES |
| | | | 100 OR MORE | | PRIORITY INCREASES WHEN PARKED IN PARKING LOT ALLOWING MORE THAN 100 VEHICLES |
| 65 | PARKING FEE | DIFFERENCE IN FEE FROM SURROUNDING PARKING LOTS | | ▓ | PRIORITY INCREASES WHEN PARKED IN PARKING LOT CHEAPER THAN SURROUNDING PARKING LOTS |
| | | PRESENCE OF FEE UPPER LIMIT | | ▓ | PRIORITY INCREASES WHEN PARKED IN PARKING LOT WITH FIXED FEE OR WITH FEE UPPER LIMIT |
| 66 | DISTANCE TO DESTINATION | | | | PRIORITY INCREASES WHEN PARKED WHERE DISTANCE TO DESTINATION IS CLOSEST |
| 67 | OPENING HOUR | OPEN 24 HOURS | | ▓▓ | PRIORITY INCREASES WHEN PARKED IN PARKING LOT THAT IS OPEN 24 HOURS |

71 WEEKDAY – MORNING (PRIORITY INFORMATION / REMARKS)
72 WEEKDAY – AFTERNOON (PRIORITY INFORMATION / REMARKS)
73 WEEKDAY – EVENING (PRIORITY INFORMATION / REMARKS)
74 WEEKDAY – NIGHT (PRIORITY INFORMATION / REMARKS)
75 HOLIDAY – MORNING (PRIORITY INFORMATION / REMARKS)
76 HOLIDAY – AFTERNOON (PRIORITY INFORMATION / REMARKS)
77 HOLIDAY – EVENING (PRIORITY INFORMATION / REMARKS)
78 HOLIDAY – NIGHT (PRIORITY INFORMATION / REMARKS)

PARKING GUIDE SYSTEM, PARKING GUIDE METHOD AND PROGRAM

INCORPORATION BY REFERENCE

The disclosure of Japanese Patent Application No. 2008-153231 filed on Jun. 11, 2008 including the specification, drawings and abstract is incorporated herein by reference in its entirety.

BACKGROUND OF THE INVENTION

The present invention relates to a parking lot guide system, a parking lot guide method and a program thereof, which introduce a parking lot.

DESCRIPTION OF THE RELATED ART

Conventionally, there have been various proposals of techniques for introducing a parking lot in the vicinity of a destination or the vicinity of a vehicle. For example, there is an on-vehicle navigation system which evaluates each of parking lots satisfying absolute conditions (vehicle height, vehicle width, vehicle length, and so on), which are inputted by the user and must be satisfied, with respect to normal conditions (parking fee, vacancy ratio, and so on) and weight (degrees of importance considered by the user), which are inputted by the user besides the absolute conditions. Then the system displays the parking lot that is ranked first (see, for example, Japanese Patent Application Publication No. H10-239076, paragraphs [0009] to [0037]).

SUMMARY OF THE INVENTION

However, the on-board navigation system described in Japanese Patent Application Publication No. H10-239076 has a problem that input operations are complicated because the user needs to input each of the "absolute conditions", "normal conditions", and "weight" via an input device.

Accordingly, the present invention provides a parking lot guide system, a parking lot guide method, and a program thereof, which are capable of automatically introducing a parking lot preferred by the user without requiring input operations for inputting selection conditions for selecting a parking lot preferred by the user.

In a parking lot guide system according to a first aspect, every time a vehicle is parked in a parking lot, a priority is set to each of a plurality of selection conditions for selecting a parking lot to be introduced based on obtained parking lot information. Thus, it is possible to set a priority suited for a user's preference automatically to each of the selection conditions for selecting a parking lot to be introduced. Therefore, it is possible to introduce a parking lot preferred by the user automatically without requiring input operations of inputting selection conditions for selecting a parking lot preferred by the user.

Further, in the parking lot guide system according to a second aspect, every time the vehicle is parked in a parking lot, a priority is set to each of the plurality of selection conditions for selecting a parking lot to be introduced based on obtained parking lot information and parking status information. Thus, it is possible to set a priority suited for a user's preference automatically to each of the selection conditions for selecting a parking lot to be introduced. Therefore, it is possible to introduce a parking lot preferred by the user automatically.

Further, in the parking lot guide system according to a third aspect, by extracting required conditions and selection conditions based on the priorities from the plurality of selection conditions, it is possible to extract a parking lot in the vicinity of a destination which satisfies the required conditions which are desired strongly by the user when parking the vehicle. Moreover, it is possible to more precisely extract a parking lot suited for the user's preference based on the recommended conditions from parking lots which satisfy the required conditions in the vicinity of the destination.

Further, in the parking lot guide system according to a fourth aspect, an order of priority is given to the parking lots in the vicinity of the destination which satisfy the required conditions based on selection contribution degrees added to the recommended conditions. Thus, it is possible to introduce the parking lots in the vicinity of the destination which satisfy the required conditions in an order suited for the user's preference.

Further, with a parking lot guide method according to a fifth aspect, every time the vehicle is parked in a parking lot, a priority is set to each of a plurality of selection conditions for selecting a parking lot to be introduced based on obtained parking lot information. Thus, it is possible to set a priority suited for a user's preference automatically to each of the selection conditions for selecting a parking lot to be introduced. Therefore, it is possible to introduce a parking lot preferred by the user automatically without requiring input operations of inputting selection conditions for selecting a parking lot preferred by the user.

Further, with a program according to a sixth aspect, every time the vehicle is parked in a parking lot, reading the program enables a computer to set a priority to each of a plurality of selection conditions for selecting a parking lot to be introduced based on obtained parking lot information. Thus, it is possible to set a priority suited for a user's preference automatically to each of the selection conditions for selecting a parking lot to be introduced. Therefore, the computer becomes capable of introducing a parking lot preferred by the user automatically without requiring input operations of inputting selection conditions for selecting a parking lot preferred by the user.

BRIEF DESCRIPTION OF THE DRAWINGS

FIG. 2 is a table showing an example of the data structure of a parking lot learning table stored in a parking lot DB;

FIG. 5 is a table showing an example of the data structures of learning tables separated into days and time zones, which are stored in a parking lot DB according to another embodiment.

DETAILED DESCRIPTION OF THE EMBODIMENTS

Hereinafter, a detailed description of a parking lot guide system, a parking lot guide method and a program thereof according to the present invention will be given with reference to the drawings based on an embodiment that embodies them in a navigation system.

[Schematic Structure of the Navigation System]

Figure 1:
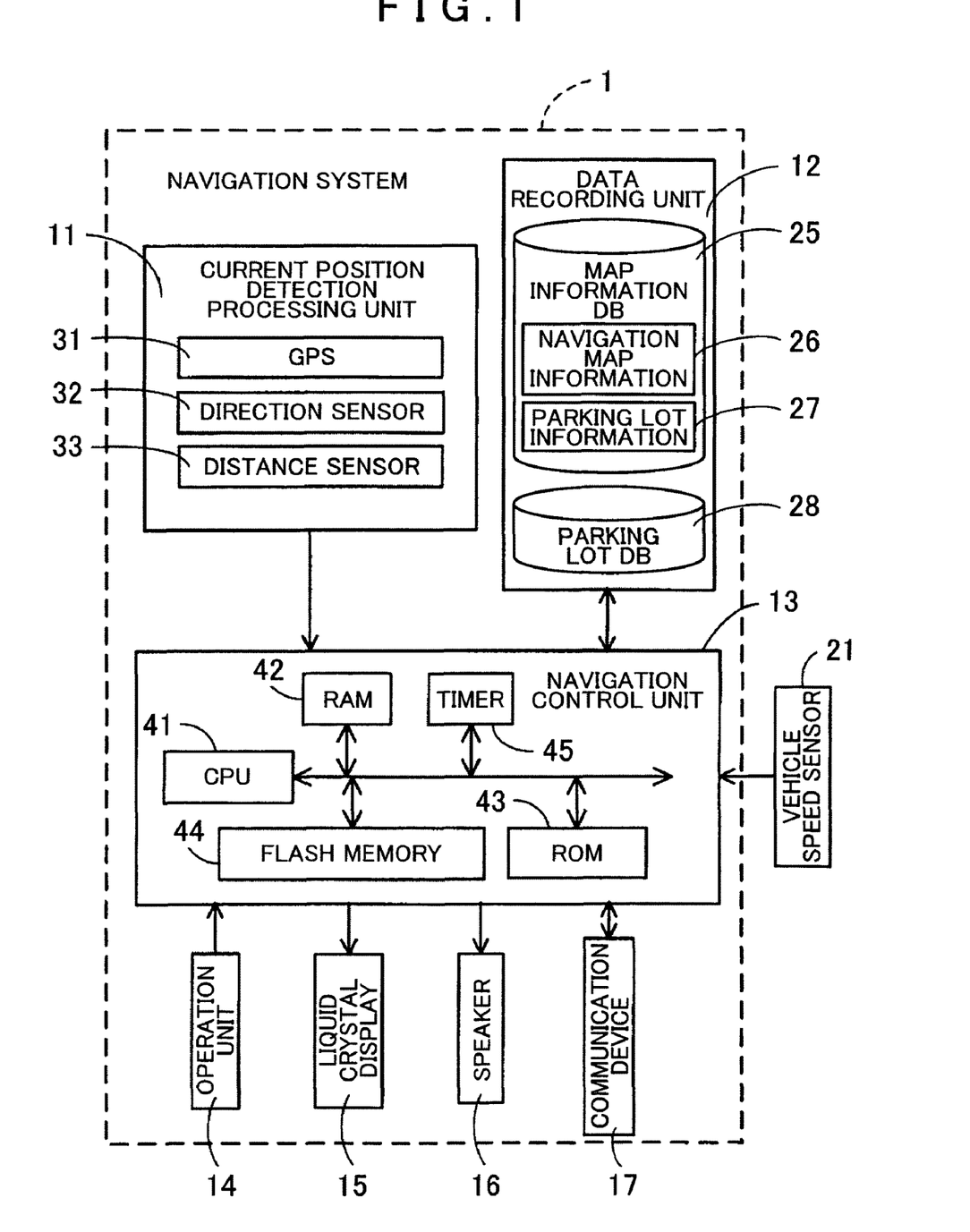
FIG. 1 is a block diagram showing a navigation system according to an embodiment.

First, based on FIG. 1, a schematic structure of a navigation system according to this embodiment will be described. FIG. 1 is a block diagram showing a navigation system 1 according to this embodiment. As shown in FIG. 1, the navigation system 1 according to this embodiment is structured from a current position detection processing unit 11 which detects the current position of a vehicle, a data recording unit 12 in which various data are recorded, a navigation control unit 13 which performs various calculation processing based on inputted information, an operation unit 14 which accepts an operation from the operator, a liquid crystal display 15 which displays information such as a map to the user, a speaker 16 which outputs an audio guidance related to a route guidance or the like, and a communication device 17 which performs communication with a not-shown road traffic information center, a map information distribution center, or the like via a mobile phone network or the like. Further, a vehicle speed sensor 21 which detects the traveling speed of the vehicle is connected to the navigation control unit 13.

Respective components forming the navigation system 1 will be described below. The current position detection processing unit 11 is structured from a global positioning system (GPS) 31, a direction sensor 32, a distance sensor 33, and so on, and is capable of detecting the current position, direction, traveling distance, and so on of the vehicle.

Further, the data recording unit 12 includes a hard disk (not shown) as an external storage device as well as a recording medium, a map information database (map information DB) 25 stored in the hard disk, a parking lot database (parking lot DB) 28, and a recording head (not shown) as a driver for reading a predetermined program or the like and writing predetermined data in the hard disk.

Further, the map information DB 25 stores navigation map information 26 used for traveling guidance or route search by the navigation system 1, parking lot information 27 used for processing to create a parking lot learning table 51 (see FIG. 2) which will be described later or the like, and so on.

Further, the navigation map information 26 is formed of various information needed for route guidance and map display, and is formed of, for example, newly built road information for identifying any newly built road, map display data for displaying a map, intersection data related to intersections, node data related to nodes, link data related to roads (links), search data for searching for a route, shop data related to Point of Interest (POI) such as shops, which are one type of facilities, search data for searching for a point, and so on. As the shop data related to POI, there are stored facility names, facility IDs, coordinates indicating the positions of facilities (for example, coordinates of center positions, and the like), facility IDs of affiliated parking lots, and so on.

As the node data, there are stored coordinates (positions) of node points set according to branch points (including intersections, T-shaped roads, and so on), radii of curvature, and so on of actual roads, node IDs, node attributes each indicating whether a node corresponds to an intersection, and so on, connection link number list listing link IDs, which are identification numbers of links connected to nodes, data related to heights and so on of node points, and so on.

As the link data, there are stored width of roads indicated by links, node IDs of both end nodes, gradients, road attributes, road types (national highway, prefectural highway, national expressway, and so on), and so on associated with link IDs by which links can be identified, with respect to road links forming roads (hereinafter referred to as "links").

Further, the parking lot information 27 is formed of various data related to parking lots (hereinafter referred to as "parking lot information"), and there are stored parking lot names, facility IDs corresponding to the aforementioned shop data, coordinate data indicating parking areas on the map (for example, a group of coordinates indicating boundaries of a parking area), center coordinate positions (for example, the latitude and the longitude of the center position of a parking area), parking fees, facility IDs of affiliated facilities which are contracted as affiliated parking lot, allowable parking hours, parking lot structures, parking lot scales, and so on.

Here, the data of the parking fees include a parking fee per hour, the presence of a fee upper limit and a parking time to reach the fee upper limit, the presence of a fixed fee, and so on. The data of the allowable parking hours include opening hours of a parking lot such as 8:00 A.M. to 9:00 P.M., 24 hours, and so on. The parking lot structures include types of parking lot such as a tower type, a gate-type flat parking lot provided with a gate at an exit, a plate type flat parking lot provided with movable plates at parking positions, a multi-level parking lot, and so on, as well as data of allowable maximum vehicle heights, minimum ground clearances, and so on. The data of the parking lot scale include allowable numbers of vehicles, such as less than 10, less than 30, less than 100, or 100 or more, or parking lot dimensions.

In addition, the contents of the map information DB 25 are updated by downloading update information distributed via the communication device 17 from the not-shown map information distribution center.

The parking lot DB 28 stores a parking lot learning table 51 (see FIG. 2), which will be described later, for performing learning every time the vehicle is parked. As will be described later, the parking lot learning table 51 is updated every time the vehicle is parked in a parking lot (see FIG. 3).

Further, as shown in FIG. 1, the navigation control unit 13 forming the navigation system 1 includes a CPU 41 as an arithmetic device and a control device performing overall control of the navigation system 1, internal storage devices such as a RAM 42 used as a working memory when the CPU 41 performs various calculation processing and storing route data or the like when a route is searched, a ROM 43 storing a program for control, programs for learning table update processing (see FIG. 3) for updating the parking lot learning table 51, which will be described later, every time the vehicle is parked in a parking lot, parking lot guide processing (see FIG. 4), which will be described later, for introducing a parking lot in the vicinity of a destination facility, and so on, and a flash memory 44 storing a program read from the ROM 43, as well as a timer counting a time, and so on.

Further, the operation unit 14, the liquid crystal display 15, the speaker 16, and the communication device 17 as peripheral devices (actuators) are connected electrically to the navigation control unit 13.

The operation unit 14 is operated when modifying the current position upon start of traveling or inputting a departure point as a guide start point and a destination as a guide end point, when performing a search for information related to a facility, or the like, and is structured from various keys and plural operation switches. The navigation control unit 13 performs control for carrying out various corresponding operations based on switch signals outputted by pressing down switches, or the like. Moreover, a touch panel is provided on a front face portion of the liquid crystal display 15, and it is structured that various instruction commands can be inputted by pressing buttons displayed on the screen or a map.

Further, the liquid crystal display 15 displays map information of a location where the vehicle is currently traveling, an operation guide, an operation menu, a key guide, a guide route from the current position to the destination, a guide information along the guide route, traffic information, and/or the like.

The speaker 16 outputs an audio guidance or the like for guiding traveling along the guide route based on an instruction from the navigation control unit 13. Here, an example of the audio guidance to be given is "turn right at the * * * intersection 200 meters ahead".

Further, the communication device 17 is a communication unit using a mobile phone network or the like for communication with the map information distribution center, and receives traffic information including various information such as traffic jam information transmitted from a road traffic information center or the like, and parking lot vacancy information.

The traffic jam information includes the distance of a jammed section, the degree of traffic jam (distinction between light congestion, moderate congestion, and so on), the link IDs of links included in the jammed section, the direction of a jammed lane, and so on.

The parking lot vacancy information includes the presence of a vacancy in a parking lot, a parking lot entrance wait time, and so on for each parking lot, associated with the facility ID identifying the parking lot.

Here, based on FIG. 2, an example of the data structure of the parking lot learning table 51 to be stored in the parking lot DB 28 will be described. FIG. 2 is a table showing an example of the data structure of the parking lot learning table 51 stored in the parking lot DB 28.

As shown in FIG. 2, the parking lot learning table 51, storing learning information related to parking of the vehicle in a parking lot, is made up of affiliated parking lot information 61, congestion status information 62, parking lot structure information 63, parking lot scale information 64, parking fee information 65, distance-to-destination information 66, and opening hour information 67, and stores respective priority points as priority information. In addition, as will be described later, numeric values are stored instead of priority points in the "maximum vehicle height" and the "minimum ground clearance" of the parking lot structure information 63.

In the affiliated parking lot information 61, a priority point indicating a priority to park in an affiliated parking lot is stored. In the congestion status information 62, there are stored priority points indicating priorities of traffic jams in the vicinity of a parking lot and the congestion status of the parking lot.

In the parking lot structure information 63, there are stored the lowest "maximum vehicle height" among those of parking lots where the vehicle has parked in the past, and the highest "minimum ground clearance" among those of parking lots where the vehicle has parked in the past. In the parking lot structure information 63, there are further stored priority points indicating priorities to park in respective types of parking lots (tower type, plate-type flat parking lot, gate-type flat parking lot, and multilevel parking lot).

In the parking lot scale information 64, there are stored priority points indicating priorities to park in parking lots with allowable numbers of vehicles of less than 10, less than 30, less than 100, or 100 or more, respectively.

In the parking fee information 65, there are stored a priority point indicating a priority to park in a parking lot that is cheaper than surrounding parking lots and a priority point indicating a priority to park in a parking lot having a fixed fee or a parking lot having a fee upper limit. In the distance-to-destination information 66, there is stored a priority point indicating a priority to park in a parking lot that is closest in distance to a destination facility. In the opening hour information 67, there is stored a priority point indicating a priority to park in a parking lot that is open 24 hours.

[Learning Table Update Processing]

Next, learning table update processing will be described based on FIG. 3, which is performed by the CPU 41 of the navigation system 1 structured as above for updating the parking lot learning table 51 every time the vehicle is parked in a parking lot.

Figure 3:
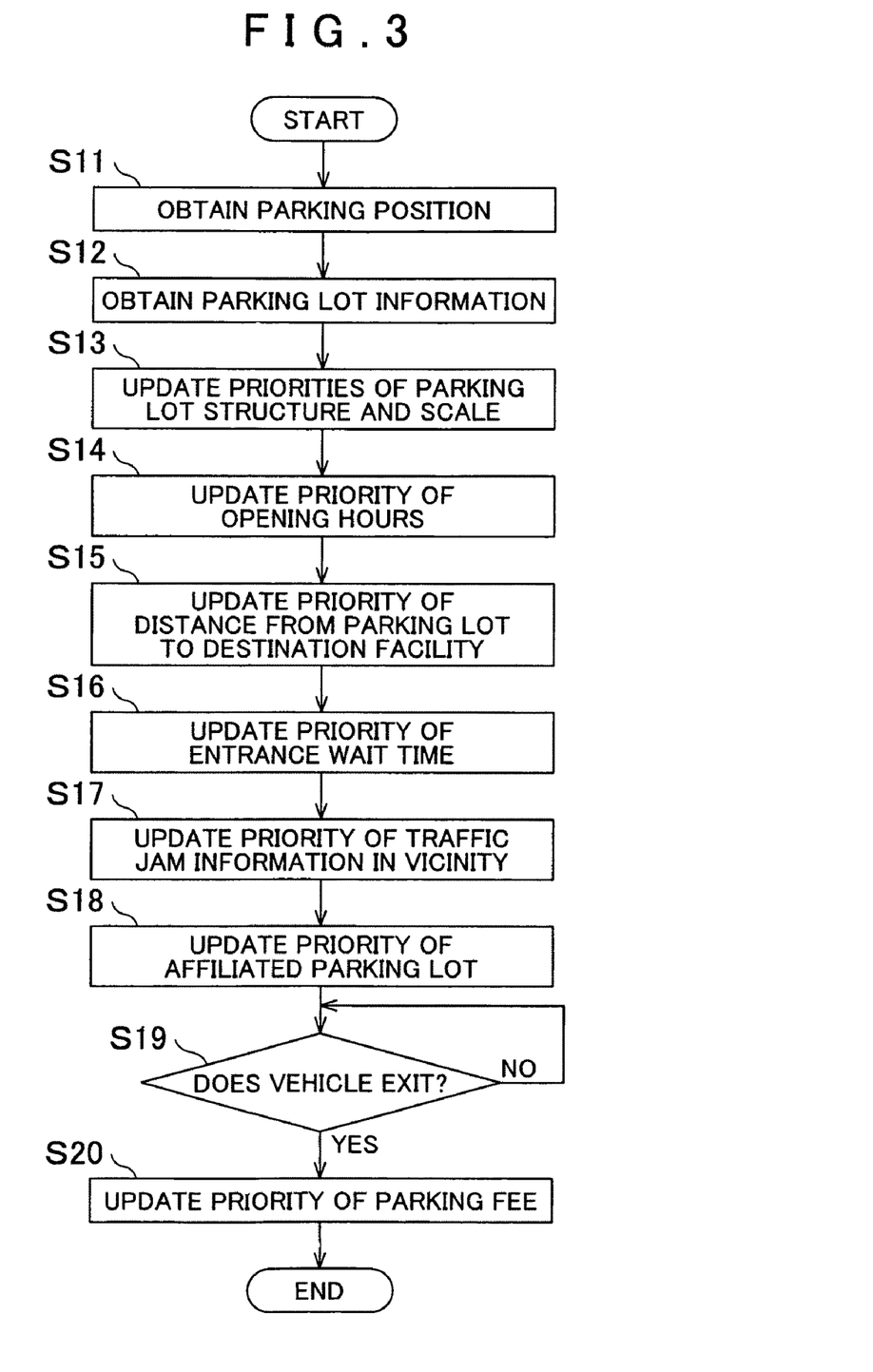
FIG. 3 is a flowchart showing learning table update processing performed by a CPU of the navigation system for updating the parking lot learning table every time a vehicle is parked in a parking lot.

FIG. 3 is a flowchart showing the learning table update processing which is performed by the CPU 41 of the navigation system 1 for updating the parking lot learning table 51 every time the vehicle is parked in a parking lot. Incidentally, the program shown by the flowchart in FIG. 3 is stored in the ROM 43 included in the navigation control unit 13 of the navigation system 1, and is executed by the CPU 41 every time the vehicle is parked in a parking lot. Specifically, the CPU 41 obtains the vehicle position via the current position detection processing unit 11 at every predetermined time, and identifies the facility ID of a parking lot existing in the vicinity of the vehicle position based on the navigation map information 26. Then the CPU 41 reads coordinate data indicating a parking area of the parking lot corresponding to the facility ID from the parking lot information 27, and when the vehicle position is located within the read parking area of the parking lot and the not-shown ignition key is turned off, the CPU determines that the vehicle is parked in a parking lot and performs the following processing.

As shown in FIG. 3, in step (hereinafter abbreviated as S) 11, the CPU 41 first detects the coordinate position (for example, the latitude and the longitude) of the vehicle based on the detection result by the current position detection processing unit 11, and stores it in the RAM 42 as coordinate data of the parking position where the vehicle is parked. Further, the CPU 41 obtains the time from the timer 45 and stores it as a parking start time in the RAM 42. The CPU 41 also reads again from the navigation map information 26 the facility name, the facility ID, the coordinate position, and so on of a destination facility set by input operations or the like to the operation unit 14, such as the touch panel and the operation switches, at the beginning of traveling or the like and stores them in the RAM 42.

Thereafter in S12, the CPU 41 reads the coordinate data of the parking position from the RAM 42, obtains the facility ID of the parking lot corresponding to the coordinate data of the parking position based on the navigation map information 26, reads the parking lot name, the coordinate data indicating a parking area on the map (for example, a group of coordinates indicating boundaries of the parking area), the center coordinate position (for example, the latitude and longitude of the center position of the parking area), the parking fee, the facility IDs of affiliated facilities contracted as affiliated parking lot, the allowable parking hours, the parking lot structure, the parking lot scale, and so on corresponding to this facility ID from the parking lot information 27, and stores them in the RAM 42 as parking lot information related to the parking lot where the vehicle is parked.

Subsequently in S13, the CPU 41 reads the allowable maximum vehicle height related to the parking lot structure of the parking lot from the parking lot information related to the parking lot where the vehicle is parked and stored in the RAM 42. The CPU 41 further reads the "maximum vehicle height" from the parking lot structure information 63 of the parking lot learning table 51 stored in the parking lot DB 28. When the allowable maximum vehicle height in the parking lot is lower than the "maximum vehicle height" read from the parking lot structure information 63 of the parking lot learning table 51, the CPU 41 then substitutes the allowable maximum vehicle height in the parking lot for the "maximum vehicle height" of the parking lot structure information 63 to update it, and stores it again in the parking lot learning table 51. On the other hand, when the allowable maximum vehicle height in this parking lot is higher than the "maximum vehicle height" read from the parking lot structure information 63 of the parking lot learning table 51, the CPU 41 stores the "maximum vehicle height" of the parking lot structure information 63 again in the parking lot learning table 51 without updating it.

Further, the CPU 41 reads the allowable minimum ground clearance related to the parking lot structure of the parking lot from the parking lot information related to the parking lot where the vehicle is parked and stored in the RAM 42. The CPU 41 also reads the "minimum ground clearance" from the parking lot structure information 63 of the parking lot learning table 51 stored in the parking lot DB 28. Then, when the allowable minimum ground clearance in the parking lot is higher than the "minimum ground clearance" read from the parking lot structure information 63 of the parking lot learning table 51, the CPU 41 substitutes the allowable minimum ground clearance in this parking lot for the "minimum ground clearance" of the parking lot structure information 63 to update it, and stores it again in the parking lot learning table 51. On the other hand, when the allowable minimum ground clearance in the parking lot is lower than the "minimum ground clearance" read from the parking lot structure information 63 of the parking lot learning table 51, the CPU 41 stores the "minimum ground clearance" of the parking lot structure information 63 again in the parking lot learning table 51 without updating it.

The CPU 41 reads the type of parking lot related to the parking lot structure of the parking lot from the parking lot information related to the parking lot where the vehicle is parked and stored in the RAM 42. The CPU 41 then reads the priority point of the parking lot structure information 63 that indicates the priority to park in a parking lot of this type from the parking lot learning table 51 stored in the parking lot DB 28, adds one point to this priority point, and stores it again in the parking lot learning table 51. That is, the CPU 41 updates the priorities of the parking lot structure information 63 that indicate priorities to park in respective types of parking lots.

For example, when the type of parking lot, which is read from the parking lot information related to the parking lot where the vehicle is parked and is related to the structure of this parking lot, is "gate-type flat parking lot", the CPU 41 reads the priority point of "gate" of the parking lot structure information 63, adds one point to this priority point, and stores it again in the parking lot learning table 51. That is, the CPU 41 updates the priority of the parking lot structure information 63 that indicates the priority to park in the "gate-type flat parking lot".

Further, the CPU 41 reads the allowable number of vehicles related to the scale of this parking lot from the parking lot information related to the parking lot where the vehicle is parked and stored in the RAM 42. The CPU 41 then reads the priority point of the parking lot scale information 64 that indicates the priority to park in a parking lot of this scale from the parking lot learning table 51 stored in the parking lot DB 28, adds one point to this priority point, and stores it again in the parking lot learning table 51. That is, the CPU 41 updates the priorities of the parking lot scale information 64 that indicate priorities to park in the parking lots with respective allowable numbers of vehicles.

For example, when the allowable number of vehicles of this parking lot read from the parking lot information related to the parking lot where the vehicle is parked is "less than 30", the CPU 41 reads the priority point for the "less than 30" of the parking lot scale information 64, adds one point to this priority point, and stores it again in the parking lot learning table 51. That is, the CPU 41 updates the priority of the parking lot scale information 64 that indicates a priority to park in a parking lot where the allowable number of vehicles is "less than 30".

In S14, the CPU 41 reads data of allowable parking hours of this parking lot from the parking lot information related to the parking lot where the vehicle is parked and stored in the RAM 42. When the allowable parking hours of this parking lot are not 24 hours, the CPU 41 then proceeds to processing of S15.

On the other hand, when the allowable parking hours of this parking lot are 24 hours, the CPU 41 reads the priority point of the opening hour information 67 that indicates a priority to park in a parking lot that is open 24 hours from the parking lot learning table 51 stored in the parking lot DB 28. Then the CPU 41 adds one point to the priority point of the opening hour information 67 and stores it again as the priority point of the opening hour information 67. That is, the CPU 41 updates the priority of the opening hour information 67 that indicates the priority to park in a parking lot that is open 24 hours.

Thereafter in S15, the CPU 41 reads data of the center coordinate position of the parking lot from the parking lot information related to the parking lot where the vehicle is parked and stored in the RAM 42, reads the coordinate position of the destination facility from the RAM 42, calculates the distance from the parking lot to the destination facility, and stores it in the RAM 42. Further, the CPU 41 reads the center position coordinates of parking lots other than the parking lot in the vicinity of the destination facility based on the navigation map information 26, reads the coordinate position of the destination facility from the RAM 42, calculates the distances from the respective parking lots to the destination facility, and stores them in the RAM 42. The CPU 41 then compares the distance from this parking lot to the destination facility stored in the RAM 42 with the distances from the respective parking lots other than the parking lot to the destination facility. When the distance from this parking lot to the destination facility is not the closest distance, the CPU 41 proceeds to processing of S16.

On the other hand, when the distance from this parking lot to the destination facility is the closest distance, the CPU 41 reads the priority point of the distance-to-destination information 66 that indicates a priority to park in a parking lot at a distance closest to the destination facility from the parking lot learning table 51 stored in the parking lot DB 28. Then the CPU 41 adds one point to the priority point of the distance-to-destination information 66 and stores it again as the priority point of the distance-to-destination information 66. That is, the CPU updates the priority of the distance-to-destination information 66 that indicates the priority to park in a parking lot at a distance closest to the destination facility.

Subsequently, in S16, the CPU 41 reads the facility ID of this parking lot from the parking lot information related to the parking lot where the vehicle is parked and stored in the RAM 42, and reads the parking lot entrance wait time corresponding to the facility ID of the parking lot from the traffic information, which is received from the road traffic information center or the like via the communication device 17 and stored in the RAM 42. Then the CPU 41 performs determination processing to determine whether or not this parking lot entrance wait time at the parking start time is equal to or longer than a predetermined time (for example, about 30 minutes or longer).

Incidentally, when the CPU 41 receives traffic information such as traffic jam information of roads around the vehicle and the destination facility (for example, the range of a radius of 2 km with the vehicle and the destination facility being the center) and parking lot vacancy information via the communication device 17, which are distributed regularly (for example, at five-minute intervals) from the road traffic information center or the like, the CPU stores and updates the latest traffic information such as traffic jam information and parking lot vacancy information based on the reception time in the RAM 42.

When the parking lot entrance wait time is equal to or longer than a predetermined time, the CPU 41 then proceeds to processing of S17.

On the other hand, when the parking lot entrance wait time is not equal to or longer than the predetermined time, the CPU 41 reads the priority point of "entrance wait time" of the congestion status information 62 that indicates the priority of the congestion status of this parking lot from the parking lot learning table 51 stored in the parking lot DB 28, adds one point to the priority point, and stores it again in the parking lot learning table 51. That is, the CPU updates the priority of the "entrance wait time" of the congestion status information 62 that indicates the priority of the congestion status of this parking lot.

Thereafter, in S17, the CPU 41 reads the center coordinate position of the parking lot where the vehicle is parked and the coordinate position of the destination facility which are stored in the RAM 42, and reads traffic jam information of roads around the parking lot and the destination facility from the latest traffic information stored in the RAM 42. Then the CPU 41 calculates the ratio of traffic-jammed links to all the links existing in a predetermined range from the destination facility based on the traffic jam information and the navigation map information 26. Specifically, the CPU 41 obtains the link IDs of all the links existing in a predetermined range from the destination facility (for example, in a circle with a radius of 1 km with the destination facility being the center) based on the navigation map information 26, and obtains the link IDs of links included in a jammed section from the latest traffic information stored in the RAM 42. The CPU 41 compares the link IDs of all the links with the link IDs included in the jammed section, to thereby calculate the ratio of jammed links (hereinafter referred to as "jammed link ratio") to all the links existing in the predetermined range from the destination facility.

Further, the CPU 41 obtains the link ID of a link adjacent to the parking lot where the vehicle is parked based on the navigation map information 26, and obtains the link IDs of the links included in the jammed section from the latest traffic information stored in the RAM 42. The CPU 41 then performs determination processing to determine whether or not the link adjacent to the parking lot where the vehicle is parked is included in the jammed section.

When the calculated jammed link ratio is equal to or larger than a predetermined threshold (for example, 50%) and the link adjacent to the parking lot where the vehicle is parked is not included in the jammed section, the CPU 41 determines that the vehicle avoided traffic jams in the vicinity of the destination facility. The CPU 41 then reads the priority point of "surrounding traffic jam" of the congestion status information 62 that indicates the priority of the traffic jams in the vicinity of this parking lot from the parking lot learning table 51 stored in the parking lot DB 28, adds one point to this priority point, and stores it again in the parking lot learning table 51. That is, the CPU 41 updates the priority of the "surrounding traffic jam" of the congestion status information 62 that indicates the priority of the traffic jam in the vicinity of this parking lot.

On the other hand, when the calculated jammed link ratio is smaller than the predetermined threshold or the link adjacent to the parking lot where the vehicle is parked is included in the jammed section, the CPU 41 proceeds to processing of S18.

Subsequently, in S18, the CPU 41 reads the facility IDs of the affiliated facilities contracted as affiliated parking lot from the parking lot information related to the parking lot where the vehicle is parked and stored in the RAM 42. Further, the CPU 41 reads the facility ID of the destination facility from the RAM 42, and performs determination processing to determine whether or not the facility ID of this destination facility is included in the facility IDs of the affiliated facilities contracted as affiliated parking lot.

When the facility ID of this destination facility is not included in the facility IDs of the affiliated facilities contracted as affiliated parking lot, the CPU 41 then proceeds to processing of S19.

On the other hand, when the facility ID of this destination facility is included in the facility IDs of the affiliated facilities contracted as affiliated parking lot, the CPU 41 reads the priority point of the affiliated parking lot information 61 that indicates a priority to park in an affiliated parking lot from the parking lot learning table 51 stored in the parking lot DB 28, adds one point to this priority point, and stores it again in the parking lot learning table 51. That is, the CPU 41 updates the priority of the affiliated parking lot information 61 that indicates the priority to park in an affiliated parking lot.

In S19, when the not-shown ignition key is turned on, the CPU 41 obtains the vehicle position at predetermined intervals, reads the coordinate data indicating the parking area of this parking lot from the RAM 42, and waits for the vehicle position to move to the outside of the parking area of this parking lot, that is, waits for the vehicle to exit from this parking lot (S19: NO). When the vehicle exits this parking lot (S19: YES), the CPU 41 obtains the current time from the timer 45 as a parking end time. The CPU 41 then reads the parking start time obtained in aforementioned S11 from the RAM 42, calculates an elapsed time from this parking start time to the parking end time, namely, a parking time and stores it in the RAM 42, and thereafter proceeds to processing of S20.

Subsequently, in S20, the CPU 41 reads data of parking fee per hour related to the parking fees of this parking lot from the parking lot information related to the parking lot where the vehicle is parked and stored in the RAM 42. Further, the CPU 41 reads the facility IDs of parking lots other than this parking lot in the vicinity of the destination facility based on the navigation map information 26, and reads data of parking fees per hour related to parking fees corresponding to the facility IDs of these parking lots from the parking lot information 27. The CPU 41 then compares the parking fee per hour related to the parking fees of this parking lot with the parking fees per hour related to parking fees of the parking lots other than this parking lot.

When the parking fee per hour of this parking lot is lower than the parking fees per hour of the parking lots other than this parking lot in the vicinity of the destination facility, the CPU 41 reads from the parking lot learning table 51 stored in the parking lot DB 28 the priority point of "difference in fee from surrounding parking lots" in the parking fee information 65 that indicates a priority to park in a parking lot cheaper than surrounding parking lots. Then the CPU 41 adds one point to the priority point of the "difference in fee from surrounding parking lots" of the parking fee information 65, and stores it again as the priority point of the "difference in fee from surrounding parking lots" of the parking fee information 65. That is, the CPU 41 updates the priority of the "difference in fee from surrounding parking lots" of the parking fee information 65 that indicates the priority to park in a parking lot cheaper than parking lots in the vicinity.

Further, the CPU 41 reads the parking time of this parking lot from the RAM 42, and reads data of presence of a fee upper limit and parking time to reach the fee upper limit, and presence of a fixed fee related to the parking fee of this parking lot, from the parking lot information related to the parking lot where the vehicle is parked and stored in the RAM 42. When there is an upper limit for the fee of this parking lot and the vehicle is parked long enough to reach the fee upper limit, or when this parking lot has a fixed fee, the CPU 41 reads the priority point of "presence of fee upper limit" of the parking fee information 65 that indicates a priority to park in a parking lot having a fixed fee or a parking lot having a fee upper limit from the parking lot learning table 51 stored in the parking lot DB 28.

Then the CPU 41 adds one point to the priority point of "presence of fee upper limit" of the parking fee information 65 and stores it again as the priority point of the "presence of fee upper limit" of the parking fee information 65. That is, the CPU updates the priority of the "presence of fee upper limit" of the parking fee information 65 that indicates the priority to park in a parking lot having a fixed fee or a parking lot having a fee upper limit. Thereafter, the CPU 41 finishes this processing.

On the other hand, when there is a lower parking fee than the parking fee per hour of this parking lot in the parking fees per hour of parking lots other than this parking lot in the vicinity of the destination facility, and moreover, there is no upper limit for the parking fee in this parking lot or this parking lot does not have a fixed parking fee, the CPU 41 finishes this processing.

[Parking Lot Guide Processing]

Next, parking lot guide processing performed by the CPU 41 of the navigation system 1 for introducing parking lots in the vicinity of a destination facility will be described based on FIG. 4.

Figure 4:
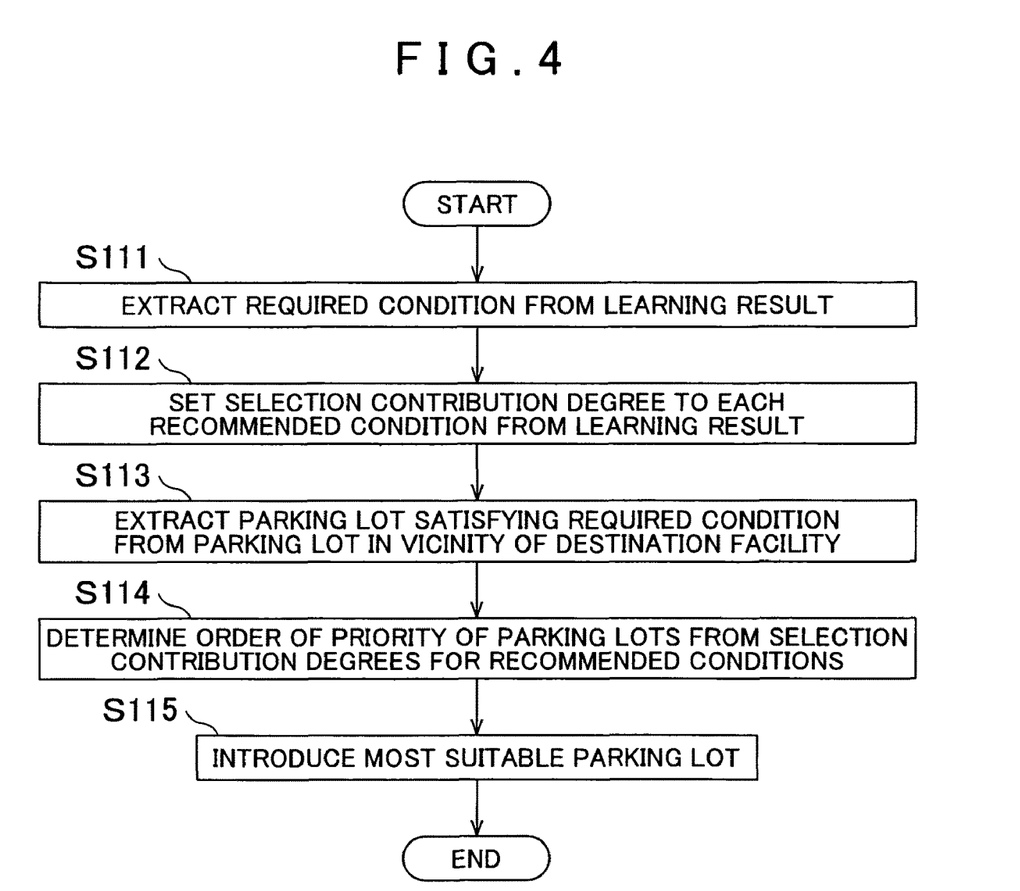
FIG. 4 is a flowchart showing parking lot guide processing performed by the CPU of the navigation system for introducing parking lots in the vicinity of a destination facility.

FIG. 4 is a flowchart showing the parking lot guide processing performed by the CPU 41 of the navigation system 1 for introducing parking lots in the vicinity of a destination facility. In addition, the program shown by the flowchart in FIG. 4 is stored in the ROM 43 included in the navigation control unit 13 of the navigation system 1, and is executed by the CPU 41 every time a destination facility is set via input operations or the like on the operation unit 14, such as a touch panel or operation switches. Specifically, when a destination facility is set via input operations or the like of the operation unit 14, the CPU 41 obtains the facility ID, coordinate position, and so on of the destination facility based on the navigation map information 26, stores them in the RAM 42, and thereafter performs processing as follows.

As shown in FIG. 4, in S111, the CPU 41 first extracts required conditions which are presumed to be strongly desired by the user from the parking lot learning table 51 stored in the parking lot DB 28.

Specifically, the CPU 41 reads data of the "maximum vehicle height" and the "minimum ground clearance" of the parking lot structure information 63 from the parking lot learning table 51, and stores them as a required condition in the RAM 42. That is, the CPU 41 extracts the allowable size for parking the vehicle in a parking lot, and stores it as a required condition in the RAM 42.

Further, the CPU 41 reads the respective priority points of the affiliated parking lot information 61, the "entrance wait time" and "surrounding traffic jam" of the congestion status information 62, the "tower type", "plate", "gate", and "multilevel parking lot" of the parking lot structure information 63, the "allowable number of vehicles" of the parking lot scale information 64, the "difference in fee from surrounding parking lots" and "presence of fee upper limit" of the parking fee information 65, the distance-to-destination information 66, and the opening hour information 67 from the parking lot learning table 51. Then the CPU extracts one having a ratio of the number of points of 90% or higher to the number of times the vehicle has parked in a parking lot in the past, and stores it as a required condition in the RAM 42.

For example, when the number of points of the priority point of the "gate" of the parking lot structure information 63 is 90% or higher relative to the number of times the vehicle has parked in a parking lot in the past, the CPU 41 stores the "gate-type flat parking lot" as a required condition in the RAM 42.

In S112, the CPU 41 then sequentially extracts as recommended conditions information other than the learning information extracted as required conditions from the parking lot learning table 51 stored in the parking lot DB 28, and sets "selection contribution degrees" of the respective recommended conditions.

Specifically, the CPU 41 sequentially extracts, as the "recommended conditions", ones that are not extracted as required conditions from the affiliated parking lot information 61, the "entrance wait time" and "surrounding traffic jam" of the congestion status information 62, the "tower type", "plate", "gate", and "multilevel parking lot" of the parking lot structure information 63, the "allowable number of vehicles" of the parking lot scale information 64, the "difference in fee from surrounding parking lots" and "presence of fee upper limit" of the parking fee information 65, the distance-to-destination information 66, and the opening hour information 67 from the parking lot learning table 51. Then the CPU 41 sequentially reads each of the priority points of the recommended conditions, calculates the ratio of the number of points to the number of times the vehicle has parked in a parking lot in the past, and sets it as the "selection contribution degree" of each recommended condition.

For example, the CPU 41 extracts the "difference in fee from surrounding parking lots" of the parking fee information 65 as a "recommended condition" from the parking lot learning table 51. Then the CPU 41 reads the priority point of the "difference in fee from surrounding parking lots" of the parking fee information 65 from the parking lot learning table 51. The CPU 41 calculates the ratio of the number of points of this priority point to the number of times the vehicle has parked in a parking lot in the past, and stores it in the RAM 42 as a "selection contribution degree" of this recommended condition.

Incidentally, when one of the "tower type", "plate", "gate", and "multilevel parking lot" of the parking lot structure information 63 is extracted as a required condition, the CPU 41 does not extract the "tower type", "plate", "gate", and "multilevel parking lot" of this parking lot structure information 63 as a recommended condition. Further, when one of the "allowable numbers of vehicles" of the parking lot scale information 64 is extracted as a required condition, the CPU 41 does not extract the "allowable numbers of vehicles" of this parking lot scale information 64 as a recommended condition.

Subsequently, in S113, the CPU 41 obtains the facility IDs of respective parking lots in the vicinity of the destination facility (for example, within a radius of about 500 m with the destination facility being the center) from the navigation map information 26. When required conditions are stored in the RAM 42 in S111, the CPU 41 sequentially reads the parking lot information corresponding to the facility IDs of the respective parking lots from the parking lot information 27, reads the latest traffic information stored in the RAM 42, and extracts parking lots satisfying the required conditions. Then the extracted parking lots are stored as "candidate parking lots" in the RAM 42.

For example, the CPU obtains the facility IDs of respective parking lots in the vicinity of the destination facility (for example, within a radius of about 500 m with the destination facility being the center) from the navigation map information 26. When the "maximum vehicle height: 220 cm", the "minimum ground clearance: 25 cm", and the "tower type" are extracted as required conditions in aforementioned S111, the CPU 41 sequentially reads the parking lot information corresponding to the facility IDs of the respective parking lots from the parking lot information 27, and extracts parking lots satisfying the required conditions. Specifically, the CPU 41 extracts parking lots satisfying conditions: maximum vehicle height of 220 cm or higher, minimum ground clearance of 25 cm or lower, and tower type. The CPU 41 stores the extracted parking lots as "candidate parking lots" in the RAM 42.

In S114, the CPU 41 then reads the selection contribution degrees set in aforementioned S112 and information of parking lot entrance wait times, traffic jams in the vicinity of the destination facility, and so on, which are distributed regularly from the road traffic information center or the like from the RAM 42, and sequentially reads parking lot information related to the respective candidate parking lots. The CPU 41 sets guide points to the respective candidate parking lots based on the selection contribution degrees set to the recommended conditions in above S112. The CPU 41 then sets the order of priority of the respective candidate parking lots in descending order of the guide points set to the respective candidate parking lots, and stores it in the RAM 42.

Here, an example of a method of setting the guide points to the respective candidate parking lots will be described specifically. First, the CPU 41 substitutes "0" for the guide points of the respective candidate parking lots to initialize them. When the affiliated parking lot information 61 does not correspond to a required condition and a candidate parking lot is an affiliated parking lot of the destination facility, the CPU 41 adds the selection contribution degree of the affiliated parking lot information 61 set in above S112 to the guide point of this candidate parking lot. Further, when the "entrance wait time" of the congestion status information 62 does not correspond to a required condition, and the entrance wait time of a candidate parking lot is not equal to or longer than a predetermined time, the CPU 41 adds the selection contribution degree of the "entrance wait time" of the congestion status information 62 set in above S112 to the guide point of this candidate parking lot.

When the "difference in fee from surrounding parking lots" of the parking fee information 65 does not correspond to a required condition, the parking fee per hour of this parking lot is lower than the parking fees per hour of the parking lots other than the parking lot in the vicinity of the destination facility, the CPU 41 adds the selection contribution degree of the "difference in fee from surrounding parking lots" of the parking fee information 65 set in above S112 to the guide point of the candidate parking lot. When the "presence of fee upper limit" of the parking fee information 65 does not correspond to a required condition and the parking fee of a candidate parking lot is fixed or there is an upper limit of parking fee, the CPU 41 adds the selection contribution degree of the "presence of fee upper limit" of the parking fee information 65 set in above S112 to the guide point of the candidate parking lot.

Subsequently in S115, the CPU 41 reads the order of priority of the candidate parking lots from the RAM 42, displays the candidate parking lot at the first place of the order of priority on the map of the liquid crystal display 15 to introduce it to the driver, and thereafter finishes this processing.

In addition, the CPU 41 may be configured to introduce the candidate parking lots by displaying information of parking lot names, distances to the destination facility, parking lot structures, parking fees, and so on in the order of priority in a list on the liquid crystal display 15.

EFFECTS OF THE ABOVE-DESCRIBED EMBODIMENT

As has been described in detail above, in the navigation system 1 according to this embodiment, every time the vehicle is parked in a parking lot, the CPU 41 updates the priorities of the information 61 to 67 stored in the parking lot learning table 51 which is stored in the parking lot DB 28, based on parking lot information related to this parking lot and information such as parking lot entrance wait times and traffic jams in the vicinity of the destination facility, which are distributed regularly from the traffic information center or the like. Thus, it becomes possible to set the priorities of the information 61 to 67 automatically to priorities suited for the user's preference. Further, as compared to the cases where the user inputs his/her preference, since this system does not require to input "absolute conditions", "normal conditions", "weights", and so on, this embodiment can eliminate a problem of complicated input operations.

Therefore, by the CPU 41 selecting parking lots based on the priorities set in the information 61 to 67 stored in the parking lot learning table 51, it is possible to automatically introduce a parking lot that is preferred by the user without requiring input operations via the operation unit 14 to input selection conditions for selecting parking lots preferred by the user.

Further, from the information 61 to 67 in the parking lot learning table 51, the CPU 41 extracts, as required conditions presumed to be strongly desired by the user, ones having a ratio of the number of points of the priority point of 90% or higher to the number of times the vehicle has parked in a parking lot in the past. Thus, by extracting candidate parking lots that satisfy these "required conditions", the CPU 41 is able to extract candidate parking lots in the vicinity of the destination that satisfy conditions strongly desired by the user when parking the vehicle.

Further, the CPU 41 sequentially reads the priority points of the information 61 to 67 in the parking lot learning table 51, calculates the ratio of the number of points to the number of times the vehicle has parked in a parking lot in the past, and sets a guide point to each candidate parking lot as a "selection contribution degree" of each recommended condition. Thus, by determining the order of priority in descending order of the guide points set to the candidate parking lots, the CPU 41 is able to introduce candidate parking lots in the vicinity of the destination that satisfy the required conditions in an order suited for the user's preference.

It should be noted that the present invention is not limited to the above embodiment, and as a matter of course, various improvements and modifications may be made in the range not departing from the gist of the present invention. For example, the following arrangements are possible.

(A) The CPU 41 of the navigation system 1 may be configured to transmit, every time the vehicle is parked in a parking lot, facility information related to the destination facility (for example, facility ID, coordinate position, and so on), parking lot information related to the parking lot where the vehicle is parked (for example, facility ID, coordinate position, and so on), data of the day of the week and time of parking, navigation identification ID, and so on to a not-shown map information distribution center.

On the other hand, the CPU of the map information distribution center may be configured to create the above parking lot learning table 51 for every navigation apparatus 1 identified by a navigation ID, based on the received information.

Further, the CPU of the map information distribution center may be configured to perform, upon reception of the facility information related to the destination facility, the navigation ID, a request command requesting introduction of parking lots in the vicinity of the destination facility, and so on from the CPU 41 of the navigation system 1, processing of above S111 to S114 to transmit candidate parking lots in the order of priority to this navigation system 1.

Accordingly, processing load on the CPU 41 of the navigation system 1 can be reduced.

(B) Further, it may be arranged that in the parking lot learning table 51, the "maximum vehicle height" and the "minimum ground clearance" of the parking lot structure information 63 are each divided into several types of heights, and respective priority points are stored as priority information. For example, the "maximum vehicle height" may be divided into "220 cm or higher, under 220 cm, under 200 cm, under 179 cm, and under 155 cm", and the "minimum ground clearance" into "25 cm or higher, 20 cm or higher, 15 cm or higher, and lower than 15 cm", and respective priority points may be stored as priority information.

In this case, in above S13, the CPU 41 reads the "maximum vehicle height" and the "minimum ground clearance" related to the structure of this parking lot from the parking lot information related to the parking lot where the vehicle is parked and stored in the RAM 42. The CPU 41 may then read the priority points of the parking lot structure information 63 that indicate the priorities corresponding to these "maximum vehicle height" and "minimum ground clearance" from the parking lot learning table 51 stored in the parking lot DB 28, add one point to their priority points, and store them again in the parking lot learning table 51.

Alternatively, in above S13, the CPU 41 reads the "maximum vehicle height" and "minimum ground clearance" related to the structure of this parking lot from the parking lot information related to the parking lot where the vehicle is parked and stored in the RAM 42. Then the CPU 41 reads the "maximum vehicle height" and "minimum ground clearance" with largest priority points from the parking lot learning table 51 stored in the parking lot DB 28.

When one to which the "maximum vehicle height" of this parking lot corresponds is smaller than the "maximum vehicle height" with the largest point, the CPU 41 sets the priority point of this "maximum vehicle height" with the largest point to 0 (zero) point, sets the priority point of the one, to which the "maximum vehicle height" of this parking lot corresponds, to the largest point, and stores them again in the parking lot learning table 51. On the other hand, the CPU 41 may be configured not to update the "maximum vehicle height" of the parking lot structure information 63 when the one to which the "maximum vehicle height" of this parking lot corresponds is not smaller than the "maximum vehicle height" with the largest point.

Further, when one to which the "minimum ground clearance" of this parking lot corresponds is larger than the "minimum ground clearance" with the largest point, the CPU 41 sets the priority point of this "minimum ground clearance" with the largest point to 0 (zero) point, sets the priority point of the one, to which the "minimum ground clearance" of this parking lot corresponds, to the largest point, and stores them again in the parking lot learning table 51. On the other hand, the CPU 41 may be configured not to update the "minimum ground clearance" of the parking lot structure information 63 when the one to which the "minimum ground clearance" of this parking lot corresponds is not larger than this "minimum ground clearance" with the largest point.

(C) Further, as shown in FIG. 5, it may be arranged that, instead of the parking lot learning table 51, learning tables 71 to 78 separated into days and time zones may be stored in the parking lot DB 28, which store the affiliated parking lot information 61, the congestion status information 62, the parking lot structure information 63, the parking lot scale information 64, the parking fee information 65, the distance-to-destination information 66, and the opening hour information 67, which are separated by days and time zones. Further, the learning tables 71 to 78 separated into days and time zones are categorized into "weekdays" indicating Monday through Friday and "holidays" indicating Saturday, Sunday, and a holiday, which are each further categorized into time zones of "morning", "afternoon", "evening", and "night". Accordingly, the CPU 41 is able to introduce parking lots preferred by the user considering the day and time zone by selecting parking lots based on the learning tables 71 to 78 separated into days and time zones.

(D) Further, the CPU 41 may be configured not to perform, when no destination facility is set by the user when the vehicle is parked in a parking lot, update processing of the priority of the distance-to-destination information 66 in above S15, update processing of the priority of the congestion status information 62 in above S17, and update processing of the priority of the affiliated parking lot information 61 in above S18, in the learning table update processing for updating the parking lot learning table 51.

(E) Further, it may be configured that, when extracting the required conditions in above S111, and when setting the selection contribution degrees for the respective recommended conditions in above S112, the CPU 41 extracts the required conditions from the parking lot learning table 51, sequentially extracts as the recommended conditions information other than the learning information extracted as the required conditions, and sets the "selection contribution degrees" of the respective recommended conditions, only when the parking lot learning table 51 is updated every time the vehicle has parked in a parking lot for a predetermined number of times or more in the past or for a predetermined period or longer in the past. In this case, the CPU 41 may store in the parking lot learning table 51 only the learning information updated every time the vehicle has parked in a parking lot for a predetermined number of times or more in the past or for a predetermined period or longer in the past, and deletes point numbers of the priority points of the learning information before that. This enables the CPU 41 to extract required conditions based on the latest priority points all the time, and set the "selection contribution degrees" of recommended conditions.

What is claimed is:

1. A parking lot guide system, comprising:
an information storage unit which stores parking lot information related to parking lots;
an information obtaining unit which obtains, every time a vehicle is parked in a parking lot,
the stored parking lot information related to the parking lot where the vehicle is parked;
a selection condition setting unit which sets a priority score for each of a plurality of selection conditions for selecting a parking lot based on the obtained parking lot information;
a dividing unit, which extracts from the plurality of selection conditions:
required conditions that are selection conditions having a ratio of the priority score to the number of times the vehicle has been parked in the parking lot in the past that is equal to or higher than a predetermined value; and
recommended conditions that are selection conditions other than the required conditions;
a parking lot extracting unit that extracts parking lots that satisfy the required conditions; and
a parking lot guide unit that communicates the extracted parking lots based on the recommended conditions.

2. The parking lot guide system according to claim 1, further comprising:
a destination information obtaining unit which obtains destination information related to a destination;
wherein the parking lot extracting unit extracts parking lots which satisfy the required conditions in a vicinity of the destination.

3. The parking lot guide system according to claim 2, wherein:
the parking lot guide unit comprises:
a selection contribution degree setting unit which sets a selection contribution degree based on the priority score for each of the recommended conditions; and
a prioritizing unit which sets an order of priority to the parking lots extracted by the parking lot extracting unit, based on the selection contribution degree;
wherein the parking lot guide unit introduces the parking lots extracted by the parking lot extracting unit based on the order of priority.

4. The parking lot guide system according to claim 1, wherein:
the information obtaining unit further obtains parking status information indicating a congestion status related to the parking lot where the vehicle is parked; and
the selection condition setting unit sets the priority score for the plurality of selection conditions based on the parking status information.

5. A parking lot guide method, comprising:
every time a vehicle is parked in a parking lot,
obtaining, from map information including parking lot information related to parking lots, the parking lot information related to the parking lot where the vehicle is parked;
setting a priority score for each of a plurality of selection conditions for selecting a parking lot based on the obtained parking lot information;
extracting from the plurality of selection conditions:
required conditions that are selection conditions having a ratio of the priority score to the number of times the vehicle has been parked in the parking lot in the past that is equal to or higher than a predetermined value; and
recommended conditions that are selection conditions other than the required conditions;
extracting parking lots that satisfy the required conditions; and
communicating the extracted parking lots based on the recommended conditions.

6. The parking lot guide method according to claim 5, further comprising:
obtaining destination information related to a destination; and
extracting parking lots which satisfy the required conditions in a vicinity of the destination.

7. The parking lot guide method according to claim 6, further comprising:
setting a selection contribution degree based on the priority score for each of the recommended conditions;
setting an order of priority to the parking lots extracted by the parking lot extracting unit, based on the selection contribution degree; and
introducing the parking lots extracted by the parking lot extracting unit based on the order of priority.

8. The parking lot guide method according to claim 5, further comprising:
obtaining parking status information indicating a congestion status related to the parking lot where the vehicle is parked; and
setting the priority score for the plurality of selection conditions based on the parking status information.

9. A non-transitory computer-readable storage medium storing a computer-executable parking lot guide program, the program comprising:
instructions for, every time a vehicle is parked in a parking lot,
obtaining, from map information including parking lot information related to parking lots, the parking lot information related to the parking lot where the vehicle is parked;
instructions for setting a priority score for each of a plurality of selection conditions for selecting a parking lot based on the obtained parking lot information;
instructions for extracting from the plurality of selection conditions:
required conditions that are selection conditions having a ratio of the priority score to the number of times the vehicle has been parked in the parking lot in the past that is equal to or higher than a predetermined value; and
recommended conditions that are selection conditions other than the required conditions;
instructions for extracting parking lots that satisfy the required conditions; and
instructions for communicating the extracted parking lots based on the recommended conditions.

\* \* \* \* \*